Oct. 3, 1950 E. E. MASTERSON ET AL 2,524,064

REELING SYSTEM FOR PLURAL TRACK MAGNETIC RECORDS

Filed March 31, 1949

INVENTORS
Earl E. Masterson
& Noel Urquhart

BY Morris A. Rabkin

ATTORNEY

Patented Oct. 3, 1950

2,524,064

UNITED STATES PATENT OFFICE 2,524,064

REELING SYSTEM FOR PLURAL TRACK MAGNETIC RECORDS

Earl E. Masterson, Palmyra, and Noel Urquhart, Merchantville, N. J., assignors to Radio Corporation of America, a corporation of Delaware Application March 31, 1949, Serial No. 84,634

6 Claims. (Cl. 179—100.2)

Our invention relates to magnetic sound recording and reproducing apparatus, particularly to improvements in reeling systems for such apparatus. Our present disclosure claims specifically the reeling system, and certain improvements upon the reeling system, first described in the copending sole application of Earl E. Masterson, Serial No. 62,754, filed November 30, 1948.

The Masterson sole application discloses a reeling system for a tape-like record of the type having a magnetizable surface of a width sufficient to accommodate two parallelly arranged sound tracks. The tape travels around a capstan in a path having the form of an "open-ended loop" and there is a double-ended magnetic transducer mounted within the loop with the polar portions of one end of the transducer in line with one sound track and the polar portions of the other end in line with the other sound track. Thus, upon relative movement between the transducer and the tape the sound tracks are brought separately into and out of contact with the different polar end portions of the transducer.

It is an object of our invention to provide an improved reeling system for plural-track phonographs of the type employing a double-ended sound head, and one wherein the changing of reels, the changeover from one sound track to the other and fast rewinding may be accomplished with ease and dispatch.

Another and important object of our present invention is to provide an improved slip-proof driving mechanism for tape machines of the general character above described and one which shall have a tape-guide member adapted to be moved out of the way, automatically, during idle periods to facilitate changing reels, and during re-reeling intervals to permit the tape to be rewound with extreme rapidity.

The foregoing and other objects are achieved in accordance with our invention by the provision of a reeling system wherein the double-ended sound head or heads which service the separate tracks on the magnetic tape, and the capstan which drives the tape, are mounted in fixed, spaced relation along a common horizontal or vertical axis and the guide rods or rollers, which define the path of the tape in its journey from one reel to the other, are mounted in a certain pattern on a movable support which is pivoted adjacent to the capstan for movement with respect to the fixedly mounted sound heads. The arrangement of the guide rods or rollers upon the movable support is such that upon movement of said support a certain distance in either direction, the tape is moved into contact with the end of the sound head which is allotted to one sound track and out of contact with the other end. In order to render the system "slip-proof" we provide a spring-biased pressure roller which normally exerts its force on the tape as it moves around the capstan. To facilitate threading the record and to permit fast rewinding, we provide the movable support, upon which the guide members are mounted, with a cam surface which operates to move the pressure roller away from the capstan when the support is moved to the position allotted to each of the said operations. We further provide a detent mechanism for halting and fixing the position the guide member support is to assume for each operation.

Our invention is further described in connection with the accompanying drawing, wherein.

Figures 1, 2, 3, 4:
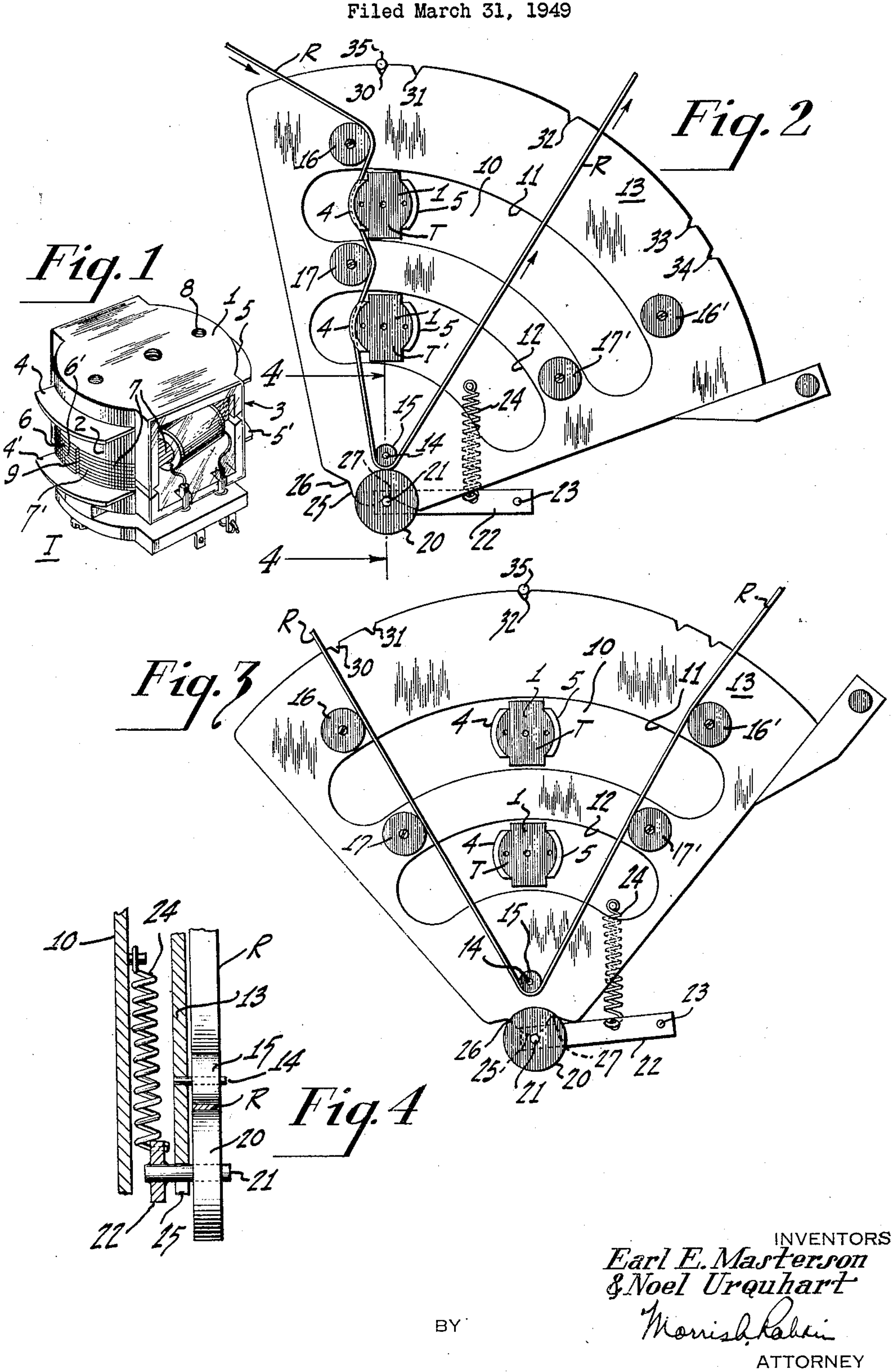
Fig. 1 is a view in perspective of a double-ended magnetic transducer of the type claimed in Masterson, Serial No. 62,754, and used in the reeling system shown in Figs. 2, 3 and 4 of our present invention.
Fig. 2 is a front elevational view of a slip-proof reeling system constructed in accordance with our invention and showing a pressure roller in contact with the tape, as during normal operation.
Fig. 3 is a view similar to Fig. 2 but showing the relative position of the transducers, tape and pressure roller during an idle interval.
Fig. 4 is a sectional view, taken on the line 4—4 of Fig. 1.

In applying our invention to a magnetic phonograph of the recording type two double-ended sound heads or transducers T, T' (Figs. 2 and 3) are required to erase, record and reproduce the "magnetic sound" on both sound tracks of a plural-track magnetic record R (Figs. 2 and 3). The transducers which we prefer to employ are of the construction described and claimed in the Masterson sole application Serial No. 62,754 and shown in perspective in Fig. 1 of the accompanying drawing.

As shown in Fig. 1, the Masterson double-ended transducer T comprises a small housing 1 having outwardly convex, oppositely located, end surfaces 2 and 3 and a pair of flanges 4—4', 5—5' on each of said ends for guiding the tape-like magnetic record R (Figs. 2 and 3) in its journey from one reel to another (reels not shown). The "lower" half of the convex end surface 2 and the "upper" half of the other convex end surface 3 comprise the polar extremities or pole pieces of a bi-part laminated magnetic structure consisting of two C-shaped pieces 6 and 7 clamped in juxtaposition between the upper and lower halves of the housing 1 by means of non-magnetic screws 8.

Figs. 2 and 3 show how two of the magnetic applicators T, T' of the type shown in Fig. 1 may serve as the erasing, recording and reproducing sound heads for both sound tracks of the plural-track record R. Here both transducers T, T' are immovably mounted in spaced relation along a common axis on a horizontally or vertically arranged back plate 10 and project through separate arcuate apertures 11 and 12 in a pivotally mounted front plate 13. There is a capstan or driving pulley 15 for the tape mounted adjacent to the pivot 14 of the plate 13 and two pairs 16—16', 17—17' of guide rods or rollers mounted in spaced-apart relation on different radii of the said plate adjacent to the opposite ends of the slots 11 and 12 through which the transducers T, T' project. The record guide members 16, 17 (or 16', 17') and the capstan 15 define a path in the form of an open-ended loop around which the record R travels with its magnetizable surface presented to the interior of the loop. Thus, when the pivoted front plate 13 is moved to the right, as is shown in Fig. 2, the guide members 16 and 17 urge the tape into contact with the left end of each of the transducers T and T', and the tape R is drawn by the capstan 15 over the air-gap 9 (Fig. 1) between the polar extremities 6' and 7' at that end of the transducers. Conversely, when the pivoted support 13 is swung to the left, the tape is moved out of contact with the left end of the transducers T and T' and is urged by the other pair of guide members 16' and 17' into contact with the polar extremities on the right side of the transducers. Since, as previously set forth, the opposite ends of the core 6—7 of each transducer are offset from each other they serve different longitudinal halves of the magnetizable surface of the tape. In the instant case, the left end of the first transducer T serves as the "erasing head" for one of the sound tracks when the tape is driven in the forward direction, and its other end surface is the erasing head for the other track when the tape is driven in the opposite direction. Similarly, the left end of the second transducer T' serves as a combined recording and reproducing head for the first-mentioned track when the tape is running forward and its other end serves as the recording and reproducing head for the other track when the tape is running in the reverse direction.

In order to prevent the record tape R from slipping in its travel from one reel to the other we provide a pressure roller 20 which normally bears against the outer or unmagnetized surface of the tape as it moves over the capstan 15. This roller 20 is mounted for rotation as on a stub shaft 21 on the free end of a lever arm 22 which is supported on a pivot 23 on the back plate 10 and is biased normally to bear against the capstan 15, and against the lower edge of the front plate 13, as by means of a coil spring 24.

It will be observed upon inspection of Figs. 2, 3 and 4 that the lower edge of the front plate 13 comprises a cam surface which consists of a centrally disposed riser 25 and a dwell, 26 and 27, respectively, on each side of the riser. As shown in Figs. 2 and 4, when the pivoted plate 13 upon which the guide members 16—16', 17—17' are supported is moved (either "left" or "right") to a position whereat the tape R is urged into contact with the transducers T and T', the stub shaft 21 of the pressure roller 20 rests in one or the other of the dwells 26 and 27 and permits the pressure roller 20 to exert its force against the tape on the capstan 15. On the other hand, when the plate 13 is moved to any intermediate position whereat the tape R is out of contact with the transducers T and T', the riser 25 bears against the shaft 21 of pressure roller 20 and moves it away from the capstan 15.

The plate 13 may be moved to any of several "intermediate positions." Thus, as shown in Fig. 3, the plate 13 may be moved to a position whereat the transducers T and T' are at the centers of the slots 11 and 12. In this case, the apex of the riser 25 of the cam on the lower edge of the plate 13 is in contact with the stub shaft 21 and, as a result, the pressure roller 20 is moved away from the capstan a distance sufficient to facilitate the substitution of one record for another.

It is also desirable to move the pressure roller 20 at least a limited distance away from the capstan 15, and to move the tape out of physical contact with the transducers T and T', when the tape R is driven by the capstan at the high speed commonly employed in rewinding a tape record. During the rewinding interval it is desirable to maintain some magnetic coupling between one of the magnetic sound tracks on the tape R and the polar extremities of the reproducing transducer or pick-up head T' so that the operator can locate (through his sense of hearing) a particular passage (music or voice) on the record. This condition will be understood to be satisfied when the pivoted front plate 13 is moved to a position intermediate that shown in Figs. 2 and 3. When moved to the said position or positions the pressure roller 20 will be moved slightly away from the capstan 15 by the force exerted by the inclined surface of the riser 25 against the shaft 21 of said roller.

In order to maintain the pivoted plate-like support 13 in a selected one of its various operating and non-operating positions we have provided a detent mechanism comprising a series of notches 30 to 34 inclusive on the upper arcuate edge of said support and a pawl 35 mounted on the back plate 10 in a position to engage the said notches. It will be apparent from an inspection of Fig. 2 that when the pawl 35 is in the end notch 30, the record R is urged by the guide members 16 and 17 into contact with the pole pieces at the left end of the transducers T and T' so that one of the sound tracks on the record is in a position to be serviced by one or the other of said transducers. Similarly, when the pawl 35 is in the other outermost notch 34 the record R is urged by the guide members 16' and 17' into contact with the pole pieces on the right end of the transducers T and T' so that the other sound track is in a position to be serviced by one or the other of the transducers.

As shown in Fig. 3, when the pawl 35 is in the center notch 32 the transducers T and T' and the pressure roller 20 are all removed the maximum distance from the tape R. As previously mentioned, this "idle" position is the one employed in changing records.

The other two notches 31 and 33 are individual to the previously described "rewind" positions whereat the tape R is out of physical contact with the transducers T and T', yet close enough to one or the other of them to maintain at least a limited degree of magnetic coupling between one transducer and one of the sound tracks on the record.

It will now be apparent that our invention provides an improved reeling system for plural-track phonographs of the type employing so-called "double-ended" sound heads, and one wherein the changing of reels, the changeover from one sound track to the other, and "fast rewinding" is accomplished with ease and dispatch.

We claim as our invention:

1. In a reeling system for a reelable magnetic record of a width sufficient to accommodate two parallelly arranged sound tracks, a capstan for applying a reeling force to said record, a plurality of guide members mounted for simultaneous lateral movement on opposite sides of said capstan in a position to define a path in the form of an open loop within which said record is adapted to be driven by said capstan, a double-ended transducer fixedly supported within said loop, said transducer having a first pair of opposed pole faces at one of its ends arranged in line with one of said sound tracks and a second pair of opposed pole faces at its opposite end arranged in line with the other of said sound tracks, and means for moving said guide members and hence said record toward and away from the pole faces at the opposite ends of said double-ended transducer.

2. The invention as set forth in claim 1 and wherein said plurality of guide members are mounted upon a common support, said support being mounted for pivotal movement about a point adjacent to said capstan and containing an arcuate slot through which said fixedly supported transducer projects.

3. The invention as set forth in claim 2 and wherein said common support for said guide members has a detent mechanism associated therewith for halting said pivotal movement at a selected one of the following positions: (1) a position whereat one of the sound tracks on said record lies contiguous the pole faces at one end of said transducer, (2) a position whereat the other of the sound tracks on said record lies contiguous the pole faces at said opposite end of said transducer, (3) a position whereat said record is out of physical contact with said first-mentioned pole faces but sufficiently close to be magnetically coupled thereto, (4) a position whereat said record is out of physical contact with said second-mentioned pole faces but sufficiently close to be magnetically coupled thereto, and (5) a position whereat said record is out of magnetically coupled relationship with both said first- and second-mentioned pole faces.

4. In a reeling system for a reelable, magnetic record of a width sufficient to accommodate two parallelly arranged sound tracks, a capstan for applying a reeling force to said record, a plurality of double-ended transducers each having a first pair of opposed pole faces at one of its ends for servicing one of said sound tracks and a second pair of opposed pole faces at its opposite end for servicing the other of said sound tracks, said capstan and said double-ended transducers being mounted in fixed, spaced relation along a common axis, a support mounted for pivotal movement about a point adjacent to said capstan, said support containing a plurality of spaced-apart arcuate slots through which said transducers respectively extend, a plurality of guide members for said record mounted upon said support adjacent to each of the opposite ends of said slots in a position to define a path in the form of an open-ended loop within which said record is adapted to be driven by said capstan, and means for moving said support on its said pivot whereby said record is urged by said guide members selectively into contact with said first and said second pair of pole faces as determined by the direction of said pivotal movement of said support.

5. In a reeling system for a reelable magnetic record of a width sufficient to accommodate two parallelly arranged sound tracks, a capstan for applying a reeling force to said record, a pressure roller mounted for movement into and out of engagement with the record on said capstan, a plurality of guide members mounted for simultaneous movement on opposite sides of said capstan in a position to define a path in the form of an open loop within which said record is adapted to be driven by said capstan, a double-ended transducer mounted within said loop, said transducer having a first pair of opposed pole faces at one end arranged in line with one of said sound tracks and a second pair of opposed pole faces at its other end arranged in line with the other of said sound tracks, means for moving said guide members and hence said record toward and away from said pole faces at the opposite ends of said double-ended transducer, and means responsive to the movement of said guide member to a predetermined position whereat said record is out of contact with said transducer for moving said pressure roller away from said capstan.

6. The invention as set forth in claim 5 wherein said plurality of guide members are mounted upon a common support mounted for pivotal movement about a point adjacent to said capstan, and wherein said last-mentioned means comprises a cam surface operatively associated with said pressure roller.

EARL E. MASTERSON.
NOEL URQUHART.

No references cited.